United States Patent
Pawlas (10) Patent No.: US 7,103,356 B2
(45) Date of Patent: Sep. 5, 2006

(54) METHOD OF OPERATING A MONEY GAME MEANS

(75) Inventor: Axel F. Pawlas, Hamburg (DE)

(73) Assignee: Bally Wulff Holding GmbH & Co. KG, Berlin (DE)

(*) Notice: Subject to any disclaimer, the term of this patent is extended or adjusted under 35 U.S.C. 154(b) by 168 days.

(21) Appl. No.: 10/109,566

(22) Filed: Mar. 28, 2002

(65) Prior Publication Data

US 2003/0109250 A1 Jun. 12, 2003

(30) Foreign Application Priority Data

Dec. 11, 2001 (EP) .................................. 01129521

(51) Int. Cl.
*H04M 3/00* (2006.01)
(52) U.S. Cl. ........................... 455/419; 463/25; 463/41
(58) Field of Classification Search .................. 463/41, 463/42, 29, 43, 25; 713/200; 455/419, 405, 455/406, 414.1, 410, 411, 517, 352, 68–70
See application file for complete search history.

(56) References Cited

U.S. PATENT DOCUMENTS

| | | | |
|---|---|---|---|
| 6,378,073 B1* | 4/2002 | Davis et al. ..................... | 726/1 |
| 6,585,598 B1* | 7/2003 | Nguyen et al. ................ | 463/41 |
| 2002/0025851 A1* | 2/2002 | Frankulin et al. .............. | 463/29 |
| 2002/0077178 A1* | 6/2002 | Oberberger et al. ........... | 463/42 |
| 2003/0069071 A1* | 4/2003 | Britt et al. ..................... | 463/42 |
| 2004/0132531 A1* | 7/2004 | George et al. ................. | 463/42 |

FOREIGN PATENT DOCUMENTS

| | | |
|---|---|---|
| DE | 19962572 A1 | 6/2001 |
| DE | 10018150 A1 | 10/2001 |
| DE | 10028028 A1 | 12/2001 |
| DE | 10039569 C1 | 12/2001 |
| DE | 19956500 A1 | 1/2002 |
| EP | 1046144 A1 | 10/2000 |
| EP | 1103934 A2 | 5/2001 |
| EP | 1106219 A2 | 6/2001 |
| EP | 1118366 A1 | 7/2001 |
| EP | 1120761 A2 | 8/2001 |
| EP | 1124208 A2 | 8/2001 |
| EP | 1150262 A2 | 10/2001 |
| WO | WO01/54087 A1 | 7/2001 |

* cited by examiner

*Primary Examiner*—Eliseo Ramos-Feliciano
*Assistant Examiner*—Wayne Cai
(74) *Attorney, Agent, or Firm*—Sutherland Asbill & Brennan LLP (57) ABSTRACT

The invention relates to a method of operating a money game means. During such operation electronic data are exchanged between a money game means (1), a server means (2), and a mobile radio telephone service means (3). A user of the money game means (1) is identified by way of electronic data exchange. Upon successful identification of the user, a credit is entered electronically in the money game means (1) whereby the user is given a stake to play an electronic game in the money game means (1). Noncash operation of money game means (1) thus is rendered possible.

15 Claims, 2 Drawing Sheets

METHOD OF OPERATING A MONEY GAME MEANS

The invention relates to electronic game equipment and is concerned more specifically with a method of operating a money game means.

Playing money game machines or money game means, users enjoy a game which is electronically controlled according to a random selection principle. Before the game begins, users must set a stake equivalent to a certain amount of money. As a rule, this stake rises or falls in the course of the electronically controlled game and thus is higher or lower at the end of the game. A user may continue to play games on the money game machine until the sum fixed as the stake has been used up. However, it is also possible for a user to decide to have his stake or part of it paid back and, especially if money has been won, to have the corresponding amount paid to the user.

With conventional money game means or money game machines the user must put cash into the machine or game means to set the stake. It is likewise conventional for users to acquire tokens from a money dispensing means, such as a money changer or money change safe for use with the money game means. In this case the user must introduce cash into the money dispensing means. Whatever the situation, to be able to start operation of the money game machine to play a game, either directly or upon previous actuation of the money dispensing equipment, the user always must carry enough cash.

It is the object of the instant invention to provide novel methods of operating a money game means that will improve the user friendliness of the money game means and, moreover, offer a wider range of application of the money game means.

That object is met, according to a first aspect of the invention, by a methodÿof operating a money game means which includes a control means and is connected to a server means so that data can be exchanged between the money game means and the server means. The method comprises the following steps:
(a) establishing a connection between a mobile radio telephone service means and the server means, said connection including a mobile radio telephone connection;
(b) electronically generating a request by the server means to input a personal identification number (PIN);
(c) transmitting the request for PIN input from the server means to the mobile radio telephone service means;
(d) electronically recording a PIN input by the mobile radio telephone service means and transmitting the PIN input recorded to the server means;
(e) electronically analyzing the PIN input recorded while automatically taking into account electronically stored user data with the aid of the server means to identify a user;
(f) transmitting clearance information from the server means to a control means of the money game means in response to the electronic analysis made in step (e); and
(g) automatically releasing electronic crediting of an amount of money in the money game means and enabling of the money game means with the aid of the control means in response to the clearance information so that the money game means is ready for a money game to be played by the user.

According to a second aspect of the invention, the object is met by a method of operating a money game means, the method comprising the following steps:
(a) establishing a connection between a mobile radio telephone service means and a server means, said connection including a mobile radio telephone connection;
(b) electronically generating a request by the server means to input a personal identification number (PIN);
(c) transmitting the request for PIN input from the server means to the mobile radio telephone service means;
(d) electronically recording a PIN input by the mobile radio telephone service means and transmitting the PIN input recorded to the server means;
(e) electronically analyzing the PIN input recorded while automatically taking into account electronically stored user data with the aid of the server means to identify a user;
(f) establishing an electronic connection for electronic data exchange between the server means and a money dispensing means, and automatically releasing crediting of an amount of money in the money dispensing means in response to the electronic analysis made in step (e);
(g) automatically making available the amount of money credited to the user by the money dispensing means; and
(h) automatically recording the amount of money credited by the money game means, and enabling use of the money game means upon electronic recording of the amount of money credited.

According to another aspect of the invention the object is met by a method of automatic cashless payment of money won in operating a money game means, the method comprising the following steps:
electronically recording actuation by a user of a repayment release means of the money game means;
transmitting electronic repayment information which includes information about the money won, especially the amount thereof, from the money game means to a server means;
electronically generating and transmitting a request by the server means to input a personal identification number (PIN);
analyzing the electronically recorded PIN input while automatically taking into account electronically stored user data with the aid of the server means to identify the user; and
electronically entering the money won as a credit against an account electronically allocated by the server means to the identified user.

The invention offers methods which permit cashless electronic administration both of the stake needed to play a game and of the money won which is available for repayment after termination of one or more games. The user of a money game means consequently can play a game even when not having the necessary amount of cash on hand. That makes it easier for a player to utilize the money game means at any point in time. Moreover, the money game means may be placed at any desired location outside a casino or the like as it is independent for its operation of a sufficient amount of cash. This broadens the application spectrum of money game means of the kind in question.

Another advantage obtained by the invention, as compared to the state of the art, resides in the fact that there is no need for cash to be put into the money game means itself. It is especially the cash accumulated in money game means which may become the target of abuse of the money game means. The risk of abusive practices in installing money game means thus is reduced because of the noncash operation of such equipment.

With the method according to the second aspect of the invention the amount entered as credit conveniently can be transferred from the money dispensing means to the money game means in the form of electronic data through an online connection. In this way, loss of the money by the user is avoided.

The use of modern cashless means of payment becomes possible with a further developmemt of the invention according to which the amount entered as credit is stored electronically on an electronic storage medium and read in the money game means by a reader for the electronic storage medium. The electronic storage medium conveniently may be a chipcard or an electronic token.

In a cost effective embodiment of the invention the amount credited also may be provided automatically in the form of tokens.

A convenient embodiment of the invention provides for an identification number of the mobile radio telephone service means to be recorded electronically while the connection exists between the mobile radio telephone service means and the server means. This identification number is analyzed within method step (e). The mobile radio telephone number associated with the mobile radio telephone service means in a respective mobile radio network is used in particular as the identification number of the mobile radio telephone service means. Recording the identification number of the mobile radio telephone service means and analyzing it for identification of the user means that yet another parameter is utilized and, therefore, the likelihood of correctly identifying the user is increased.

A preferred embodiment of the invention offers operation of the money game means by any users, regardless of the banking institution selected by them. To accomplish that, it is provided that method step (f) be preceded by at least part of the user data being transmitted electronically to a bank server means, and by the bank server means and the server means electronically debiting theÿrespective amount of money.

In a preferred modification of the invention, provision may be made for electronic determination of a subscriber number by the server means and its utilization by the mobile radio telephone service means for establishing the connection between the mobile radio telephone service means and the server means according to method step (a). And, furthermore, automatic identification may be provided of the money game means/money dispensing means by way of electronically analyzing the subscriber number determined as well as electronically stored money game means data/money dispensing means information which includes electronic allocation of the subscriber number to the money game means/money dispensing means. This is a simple way of assuring that the data exchange between the mobile radio telephone service means and the server means is allocated reliably to the money game means/money dispensing means which the user desires to utilize or have enabled.

A preferred modification of the invention makes the individual steps of the process of enabling the money game means and the consequences thereof more readily comprehensible to the user by electronically generating information about the debiting of the amount of money and communicating the same by SMS (short message service) to the mobile radio telephone service means.

User friendliness of the money game means is enhanced in a convenient modification of the invention in that the electronically credited amount of money is output on a display means of the money game means/money dispensing means.

According to another embodiment of the invention, method step (a) of the method of the invention is preceded by the following method steps:

electronically recording a keypad input, which includes the identification number of the mobile radio and telephone service means, by the control means of the money game means, the keypad being formed as part of the money game means and being connected to the control means;

transmitting electronic input information which includes information about the keypad input recorded, especially the identification number of the mobile radio telephone service means, from the money game means to the server means; and having the server means process the input information in a way in which the server means utilizes the identification number for automatically releasing the establishing of the connection between the server means and the mobile radio telephone service means.

In this manner an existing keypad on the money game means may be actuated by the user to enter a credit in the money game means, thus causing the same to be enabled. In such an event the user receives a call back from the provider of the server means via his mobile radio telephone service means, rather than having to make a mobile radio telephone connection himself to the server means which, normally, would involve costs to be borne by the user.

An advantageous further development of the invention permits any random number of persons to play a money game means, even if they have different banks or credit institutions entrusted with their accounts. To accomplish that, the respective amount of money is debited against an account electronically allocated by the server means to the user and is entered as a credit against an account which is electronically allocated to the money game means/money dispensing means.

The PIN input is recorded by a mobile radio telephone service means and transmitted to the server means, in a convenient further development of the method of automatically making cashless payments of money won in operating a money game means. As a result, the situation is improvedÿas regards the positioning of money game means.

Additional usage of the mobile radio telephone service means involving extra costs with which the user might be charged can be avoided by an advantageous embodiment of the invention in that the PIN input is recorded by the money game means/money dispensing means and transmitted to the server means.

In a convenient modification of the invention, crediting information about the electronic entry of the repayment sum is generated electronically and communicated by short message service (SMS) to the mobile radio telephone service means. This makes it easier for the user of the money game means to understand the various method steps and their consequences.

The invention will be described further, by way of example, with reference to a drawing, in which.

Figure 1:
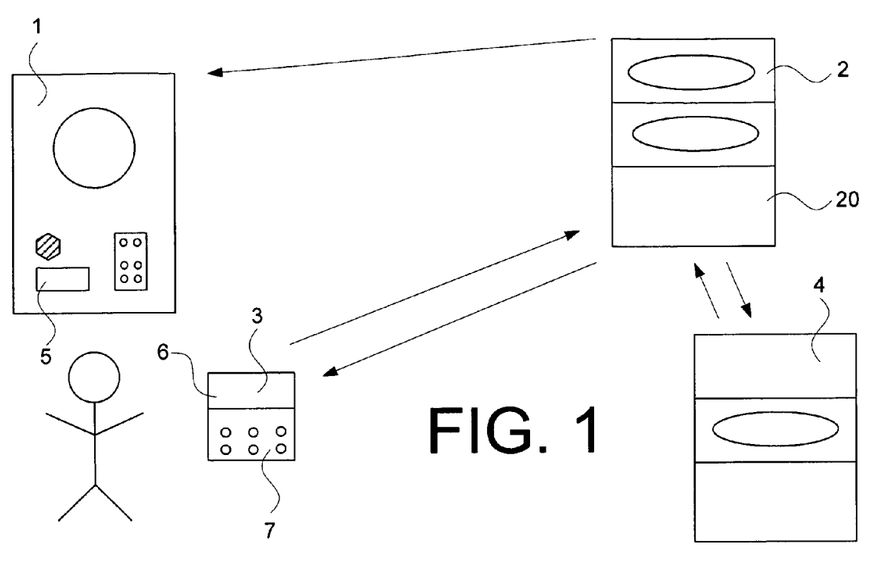
FIG. 1 is a diagrammatic illustration to describe a method of enabling a money game means.

Referring to FIG. 1, an embodiment first will be described of a method of enabling a money game means 1. The money game means 1 may be connected electronically to a server means 2 so that electronic data exchange is made possible between the money game means 1 and the server means 2. The server means 2 preferably is operated by a so-called provider.

Information is exchanged between the server means 2 and a mobile radio telephone service means 3, including in the exchange a mobile radio network to which the mobile radio telephone service means 3 is admitted. Moreover, the server means 2 may exchange electronic data with a bank server means 4. This exchange of data may be accomplished by any appropriate technique desired, such as by radio transmission or an on-line connection.

A user wishing to apply the method of enabling the money game means 1, first must register as a user. This registration can be done by way of an application form to be filled in by the user. Provision may be made for the user to fill in the form, whereupon the data indicated are input into a computer system to be stored in a data base 20. As an alternative, it may be provided that the user fills in an electronic application form. The data to be given by the user may include such things as the name, address, and a banking connection. Furthermore, the user must declare his/her consent to take part in the system of cashless utilization of the money game means 1.

Upon recording of the data presented by the user in the data base 20, a personal identification number PIN is allocated to the user. The PIN is memorized in the data base 20 in a way in which it is electronically associated with the user or the user data stored for the user. Subsequently the user is informed of the PIN. That may be done automatically, for instance, by SMS information to the mobile radio telephone service means 3.

To be able to play an electronic money game on the money game means 1, the user then must call a telephone number which is output, for example, on a display means 5 of the money game means 1. The telephone number also might be printed on the money game means or on a lable stuck to the same. Upon dialing of the telephone number with the aid of the mobile radio telephone service means 3 a connection is set up between the server means 2 and the mobile radio telephone service means 3. The server means 2 records the telephone number dialed by the user and automatically recognizes that it is a request for utilization of the money game means 1. Thereupon, a request to input the PIN is generated electronically in the server means 2, and this request is transmitted to the mobile radio telephone service means 3. Based on the request, a corresponding input is asked to be made on a display 6 of the mobile radio telephone service means 3. This is followed by the input of the PIN of which the user was informed when registering. The PIN input by the user is recorded by the mobile radio telephone service means 3. The mobile radio telephone service means 3 transmits the data recorded to the server means 2. In the server means 2 the information received from the mobile radio telephone service means 3 is analyzed to identify the user. If it is discovered during this identifying process that the user has not yet been registered an error message is generated and transmitted to the mobile radio telephone service means 3 to inform the user of the lacking registration.

If, on the other hand, it is found that the user is registered he/she is requested to enter an amount of money which he/she desires to be set as the stake for playing the money game means 1. That is accomplished by the generation of suitable electronic data in the server means 2, their transmission to the mobile radio telephone service means 3, and the recording as well as transmission of the user input. The user preferably performs the input through a keypad 7 of the mobile radio telephone service means 3 or by speech input.

Upon identification of the user, a connection is set up automatically between the server means 2 and the bank server means 4 to debit the amount of money indicated by the user against a user account. To that end, at least part of the user data stated on registration of the user, especially the banking connection, are transmitted from the server means 2 to the bank server means 4. Based on the user data, the user account is identified and electronic debiting is effected against this account in accordance with the amount of money desired by the user.

Based on the telephone number initially dialed by the user to obtain the connection between the mobile radio telephone service means 3 and the server means 2, the server means 2 recognizes the money game means 1 on which the user wishes to play an electronic game. For this purpose the server means, for instance, may have an allocation table at its disposal showing the correspondence between various telephone numbers and money game means. Electronic analysis of the allocation table permits the server means 2 to allocate the exchange of data between the mobile radio telephone service means 3 and the server means 2 as well as the debiting effected with the aid of the bank server means 4 to the money game means 1. Once the money game means 1 has been identified in this manner, the server means 2 will transmit suitable electronic signals to the money game means 1, specifically the control means thereof (not shown) in order to effect crediting against the money game means 1 so that the user may dispose of the amount of money chosen as the stake for playing games. The money game means 1 is enabled by the electronic signals transmitted from the server means 2 to the money game means and thus is ready to be used.

Another embodiment of the method of operating the money game means 1 will be described with reference to the diagrammatic presentation in FIG. 2. With this embodiment, too, an electronic exchange of data takes place between the money game means 1 and the server means 2, the mobile radio telephone service means 3 and the server means 2, as well as the server means 2 and the bank server means 4. The user actuates a keyboard means 8 formed as part of the money game means 1 to enter his/her mobile radio telephone number. The mobile radio telephone number is the number allocated to the mobile radio telephone service means 3 in the mobile radio network used (cellular or mobile phone number). Furthermore, the user utilizes the keyboard means 8 for the input of information regarding the amount of money desired to be set as the stake for playing electronic games on the money game means 1. In response, the money game means 1 sets up a connection to the server means 2. This may be done via a radio network or a fixed network. The money game means 1 is equipped with adequate interface means, for instance, a modem.

In this embodiment the server means 2 preferably is formed as part of the accounting or clearing center of a provider. As such, the server means 2 has electronic data at its disposal which allow it to electronically allocate the mobile radio telephone number entered by the user to the user. Upon transmission of the mobile radio telephone number from the money game means 1 to the server means 2, the server means 2 initiates the necessary steps which will lead to establishing the connection between the mobile radio telephone service means 3 and the server means 2, in other words the mobile radio telephone service means 3 will receive a call. Following that, the server means 2 generates the requisite electronic data to obtain confirmation from the user of the mobile radio telephone service means 3 that the user wishes to play the money game means 1. In this procedure the user must confirm the amount of money which was input previously as the stake. Moreover, the user is asked for his PIN which then is analyzed electronically in the server means 2, as already described above in connection with the embodiment of the method illustrated in FIG. 1.

Upon identification of the user, based on the PIN and on confirmation by the user of the desired amount of money to be set as stake, the server means 2 electronically enters a debt corresponding to this amount of money against an account administered in the bank server means 4. This again is accomplished by way of electronic data exchange. When the electronic debiting has been performed the server means 2 generatesÿelectronic signals and transmits them to the money game means 1 where they are processed in such a way as to enable the money game means 1 so that it may be played by the user.

Figure 2:
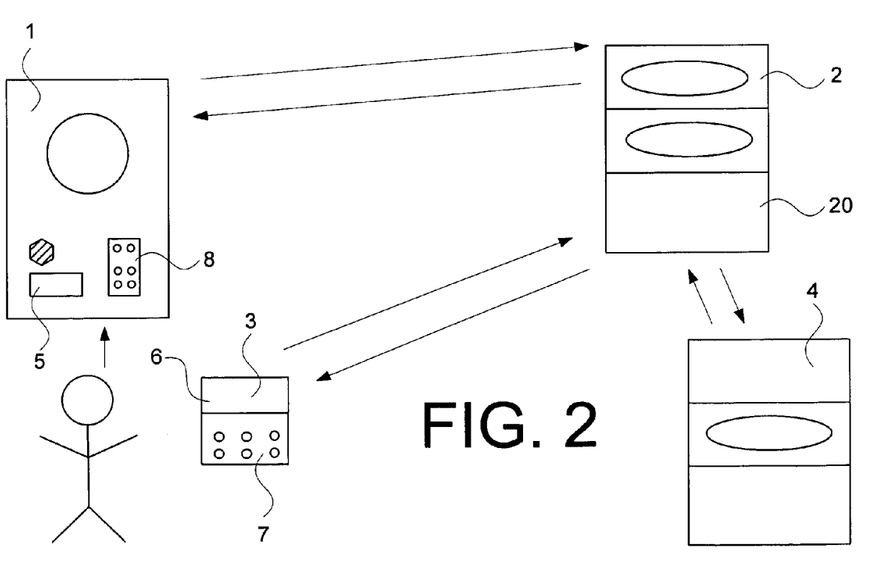
FIG. 2 is a diagrammatic illustration to describe another embodiment of a method of enabling a money game means.
Figure 3:
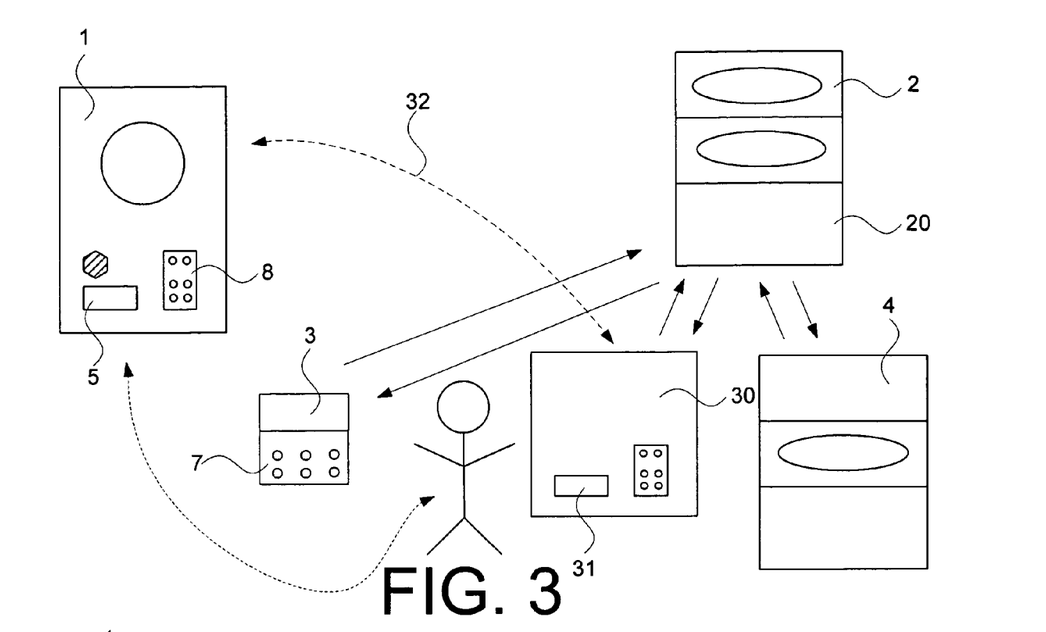
FIG. 3 is a diagrammatic illustration to describe another embodiment of a method of operating a money game means.

FIG. 3 is a diagrammatic drawing to illustrate another method of operating the money game means 1. Other than with the methods explained with reference to FIGS. 1 and 2, the embodiment shown in FIG. 3 is a method which automatically provides means of payment, i.e. an amount of money which may be used to play games in the money game means 1, through the intermission of a money dispensing means 30 which engages in an electronic data exchange with the server means 2. The money dispensing means 30, for instance, is a money changer or money change safe. With the method of operating the money game means 1 as illustrated in FIG. 3, the server means 2, the mobile radio telephone service means 3, and the bank server means 4 are utilized automatically in particular for electronic data exchange, user identification, debiting of the amount of money, etc. in a manner similar to the method described with reference to FIG. 1 or FIG. 2. The mobile radio telephone service means 3 is utilized in the way described above for data communication with the server means 2. The server means then analyzes the messages received, automatically generates replies and transmits them, and also controls the electronic data exchange with the bank server means 4 etc. Other than with the embodiments described in connection with FIGS. 1 and 2, the amount of money which the user desires to fix for operating the money game means 1 is made available automatically with the aid of the money dispensing means 30, in the FIG. 3 embodiment. That may be accomplished, on the one hand, by the output of tokens from a discharge means 31 to the user. On the other hand, the user might receive the amount of money in the form of an electronic credit on a chipcard. To this end, the money dispensing means 30 comprises a chipcard read/write unit (not shown). The amount of money placed at the user's disposal with the aid of the money dispensing means 30 is recorded automatically by the money game means 1 so that the user may make use of this money as the stake in one or more games. With this embodiment, either the money game means 1 automatically recognizes the tokens, or the chipcard is read by a suitable reader and, thereupon, the money game means is enabled.

It may be arranged that electronic data are exchanged through an online connection between the money game means 1 and the money dispensing means 30 after the amount of money desired by the user has been provided electronically at the money dispensing means 30. In this manner the money game means 1 would receive a message from the money dispensing means 30 regarding the amount of money credited. And this amount of money then would be available to the user for an electronic game to be played.

Both, the embodiment of the method illustrated in FIG. 1 and the one according to FIG. 2 may comprise provision for the server means 2 to generate electronic information about the debiting made by the bank server means 4 and to send these data as SMS information to the mobile radio telephone service means 3.

Figure 4:
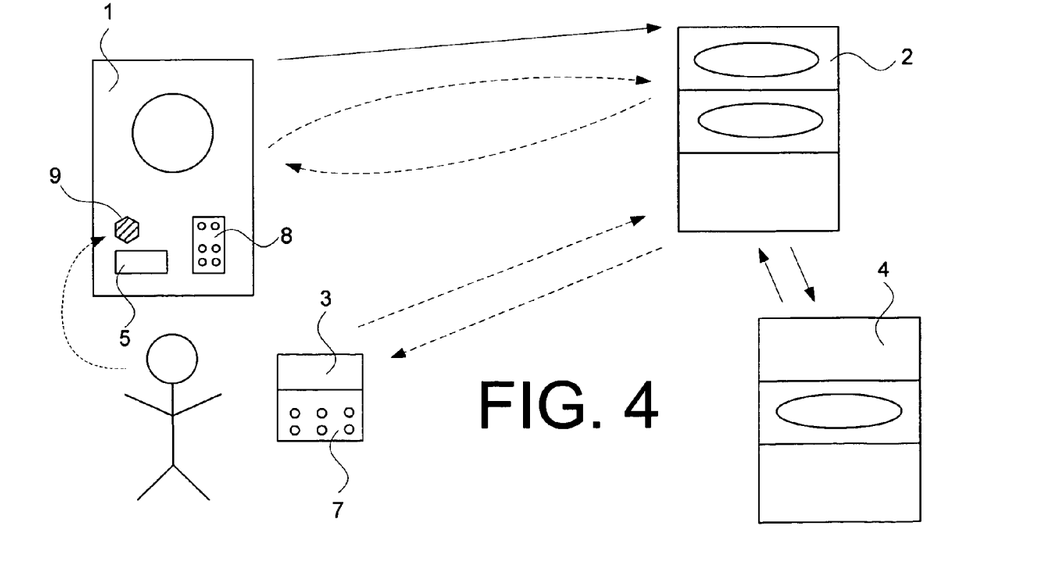
FIG. 4 is a diagrammatic illustration to describe methods of automatic noncash payment of money won when operating a money game means.

A method of automatic cashless payment of money won or money left over from operating the money game means 1 will now be described with reference to FIG. 4. After having played one or more games, the amount of money fixed by the user as his/her stake may be spent altogether. But it is likewise possible that the user won money in the games and now has the right to receive that money. In a different situation, the user may decide to stop playing the money game means 1 before the entire stake is used up so that he is owed repayment of the residual amount of money. If the user is entitled to money won and/or money left over he may actuate a pay-back key 9 to cause repayment of the amount of money in question. In one embodiment, actuation of the pay-back key 9 is followed by transmission of electronic information from the money game means 1 to the server means 2 by which the server means 2 is instructed that the user wants his money back. At this point in time, or later, the money game means 1 lets the server means 2 know the amount of repayment. The server means 2 once again initiates the identification of the user so that the amount of money to be paid back will be credited against the right account. This involves electronic generation of another request for PIN input and its transmission to the money game means 1 or the mobile radio telephone service means 3. The user's PIN input in response to this request through the keyboard means of the money game means or the keypad 7 of the mobile radio telephone service means 3 is recorded electronically and analyzed by the server means 2. The amount of money in question is credited electronically against an account allocated to the user through electronic data exchange between the server means 2 and the bank server means 4 when the user has been identified and after optional confirmation of the repayment sum by the user.

If only a minor amount of money, say less than DEM 5.—is owed to the user of the money game means 1 after conclusion of the games played, the arrangement may be such that this amount is refunded through a cash dispensing device. For this purpose, the money game means 1 thus may include a per se known device of the kind in question (not shown). Where money game means work entirely without any cash payments, electronic information as to the repayment sum may be transmitted to an automatic small change machine. The user then may have such a machine reimburse his money. It would also be feasible in this context to store electronic information about the amount due for repayment on a money card utilized by the user who may then slip the money card into the automatic small change machine to get his money back.

When user identification, especially PIN recording is undertaken with the aid of the mobile radio telephone service means 3, first the server means 2 dials or calls the mobile radio telephone service means 3 to initiate the identifying procedure. The mobile radio telephone number required for this procedure is communicated by the user to the server means 2 by another input into the keyboard means 8 of the money game means. It is likewise possible to provide for automatic determination of the mobile radio telephone number of the mobile radio telephone service means 3 by the server means 2 on the basis of the PIN input recorded. To this end the server means resorts to previously stored user data.

Moreover, it may be provided that information about the electronic crediting made against the user's account is generated automatically by the server means 2 and transmitted to the mobile radio telephone service means 3 by SMS communication.

The features of the invention disclosed in the above description, drawing, and claims may be essential to the realization of the invention in its various embodiments, both individually and in any combination.

What is claimed is:

1. A method of operating a money game means which includes a control means and is connected to a server means, permitting data to be exchanged between the money game means and the server means, the method comprising the following steps:
    (a) electronically recording a keypad input which includes an identification number of a mobile radio telephone service means by the control means of the money game means or a control means of a money dispensing means, the keypad being formed as part of the money game means/money dispensing means and being connected to the respective control means;
    (b) transmitting electronic input information which includes information associated with the keypad input recorded, from the money game means/money dispensing means to the server means, wherein the information associated with the keypad input recorded includes the identification number of the mobile radio telephone service means;
    (c) having the server means process the input information in a way in which the server means utilizes the identification number for automatically establishing a connection between the server means and the mobile radio telephone service means;
    (d) establishing the connection between the mobile radio telephone service means and the server means, said connection including a mobile radio telephone connection;
    (e) electronically generating a request by the server means to input a personal identification number (PIN);
    (f) transmitting the request for PIN input from the server means to the mobile radio telephone service means;
    (g) electronically recording a PIN input by the mobile radio telephone service means and transmitting the PIN input recorded to the server means;
    (h) electronically analyzing the PIN input recorded while automatically taking into account electronically stored user data with the aid of the server means to identify a user;
    (i) transmitting clearance information from the server means to the control means of the money game means or the money dispensing means in response to the electronic analysis made in step (h); and
    (j) automatically releasing electronic crediting of an amount of money in the money game means and enabling the money game means with the aid of the control means in response to the clearance information so that the money game means is ready for a money game to be played by the user.

2. The method of claim 1, characterized in that the amount of money is debited against an account electronically allocated by the server means to the user and is entered as a credit against an account electronically allocated to the money game means/money dispensing means.

3. The method of claim 1, characterized in that prior to method step (i) at least a portion of the user data is electronically transmitted to a bank server means, and the amount of money is debited electronically by the bank server means and the server means.

4. The method of claim 3, wherein information associated with the amount of money debited is generated electronically by the server means and transmitted to the mobile radio telephone service means by SMS (short message service) communication.

5. The method of claim 1, wherein the electronically credited amount of money is output by a display means of the money game means/money dispensing means.

6. The method of claim 1, wherein automatically releasing electronic crediting of an amount of money in the money game means and enabling the money game means includes:
    automatically making available the amount of money credited to the user by the money dispensing means; and
    automatically recording the amount of money credited by the money game means, and enabling use of the money game means upon electronic recording of the amount of money credited.

7. The method of claim 6, wherein the amount credited is transferred through an online connection from the money dispensing means to the money game means by electronic data.

8. A method of operating a money game means, the method comprising the following steps:
    (a) electronically recording a keypad input which includes an identification number of a mobile radio telephone service means by control means of the money game means or control means of a money dispensing means, the keypad being formed as part of the money game means/money dispensing means and being connected to the respective control means;
    (b) transmitting electronic input information which includes information associated with the keypad input recorded from the money game means/money dispensing means to a server means, wherein the information associated with the keypad input recorded includes the identification number of the mobile radio telephone service means;
    (c) having the server means process the input information in a way in which the server means utilizes the identification number for automatically establishing a connection between the server means and the mobile radio telephone service means;
    (d) establishing the connection between the mobile radio telephone service means and the server means, said connection including the mobile radio telephone connection;
    (e) electronically generating a request by the server means to input a personal identification number (PIN);
    (f) transmitting the request for PIN input from the server means to the mobile radio telephone service means;
    (g) electronically recording a PIN input by the mobile radio telephone service means and transmitting the PIN input recorded to the server means;
    (h) electronically analyzing the PIN input recorded while automatically taking into account electronically stored user data with the aid of the server means to identify a user;
    (i) establishing an electronic connection for electronic data exchange between the server means and the money dispensing means, and automatically releasing crediting of an amount of money in the money dispensing means in response to the electronic analysis made in step (h);

(j) automatically making available the amount of money credited to the user by the money dispensing means; and (k) automatically recording the amount of money credited by the money game means, and enabling use of the money game means upon electronic recording of the amount of money credited.

9. The method of claim 8, characterized in that the amount of money is debited against an account electronically allocated by the server means to the user and is entered as a credit against an account electronically allocated to the money game means/money dispensing means.

10. The method of claim 8, further comprising:

(i) transmitting electronic repayment information which includes information associated with money won from the money game means to the server means; and (j) electronically entering the money won as a credit against an account electronically allocated by the server means to the identified user.

11. The method of claim 10, wherein crediting information associated with the electronic entry of the money won is generated electronically by the server means and transmitted to the mobile radio telephone service means by SMS (short message service) communication.

12. The method of claim 8, characterized in that prior to method step (i) at least a portion of the user data is electronically transmitted to a bank server means, and the amount of money is debited electronically by the bank server means and the server means.

13. The method of claim 12, wherein information associated with the amount of money debited is generated electronically by the server means and transmitted to the mobile radio telephone service means by SMS (short message service) communication.

14. The method of claim 8, wherein the electronically credited amount of money is output by a display means of the money game means/money dispensing means.

15. The method of claim 8, wherein the amount credited is transferred through an online connection from the money dispensing means to the money game means by electronic data.

* * * * *

UNITED STATES PATENT AND TRADEMARK OFFICE
CERTIFICATE OF CORRECTION

PATENT NO. : 7,103,356 B2
APPLICATION NO. : 10/109566
DATED : September 5, 2006
INVENTOR(S) : Axel F. Pawlas It is certified that error appears in the above-identified patent and that said Letters Patent is hereby corrected as shown below:

Col. 11, lines 16-22, Claim 10 "i" should read --(I)-- and "(j)" should read --(m)--.

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,103,356 B2 |
| APPLICATION NO. | : 10/109566 |
| DATED | : September 5, 2006 |
| INVENTOR(S) | : Axel F. Pawlas |

It is certified that error appears in the above-identified patent and that said Letters Patent is hereby corrected as shown below:

Col. 11, lines 16-22, Claim 10 "i" should read --($\ell$)-- and "(j)" should read --(m)--.

This certificate supersedes Certificate of Correction issued January 2, 2007.

Signed and Sealed this

Third Day of July, 2007

JON W. DUDAS
*Director of the United States Patent and Trademark Office*